Sept. 23, 1969     F. B. HARRIS     3,468,414
INSTANT PAPER-MACHE
Filed March 10, 1967     2 Sheets-Sheet 1
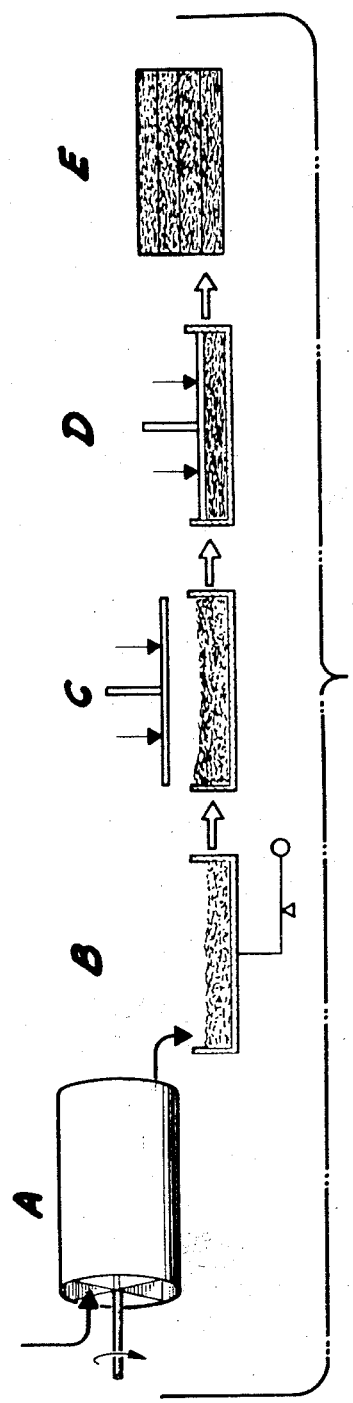
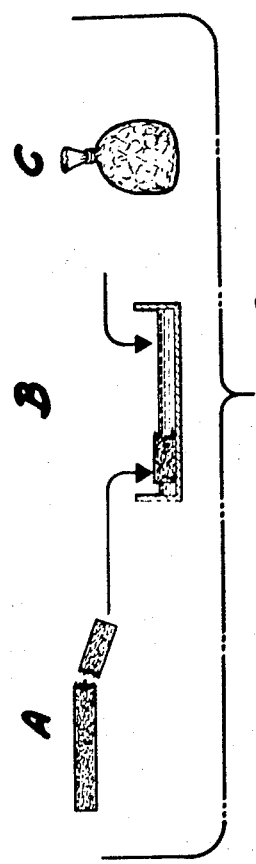
INVENTOR.
FRITZ B. HARRIS
BY
Lippincott, Ralls & Hendrickson
ATTORNEYS Sept. 23, 1969  F. B. HARRIS  3,468,414
INSTANT PAPER-MACHE Filed March 10, 1967  2 Sheets-Sheet 2

INVENTOR.
FRITZ B. HARRIS
BY
Lippincott, Ralls & Hendricson
ATTORNEYS

United States Patent Office

3,468,414
Patented Sept. 23, 1969

1

3,468,414
INSTANT PAPER-MACHE
Fritz B. Harris, Los Gatos, Calif., assignor to Activa Corporation, San Francisco, Calif., a corporation of California
Filed Mar. 10, 1967, Ser. No. 622,253
Int. Cl. B69 79/00
U.S. Cl. 206—47                                9 Claims

ABSTRACT OF THE DISCLOSURE

The invention disclosed and claimed hereto pertains to a mixture of materials such as ground newspaper, starch perservative and plaster of paris, or the like, having different particle sizes and densities which are uniformly dispersed through a dry mixture thereof, and so maintained by pressure in a solid form for storage and shipping. The mixture of materials is adapted with the addition of water to form a soft, clay-like substance that may be formed or molded by hand or machine into any desired shape, and which, upon drying, will harden into a strong, tough material that may be further operated on or directly utilized in molded form. The invention is particularly directed to the maintenance of an even dispersion of dry materials throughout the mixture maintained in a solid, brick-like form prior to the addition of water, so as to facilitate storage and shipping of the material without settling or separation of the constituents thereof.

BACKGROUND OF THE INVENTION

Figure 3:
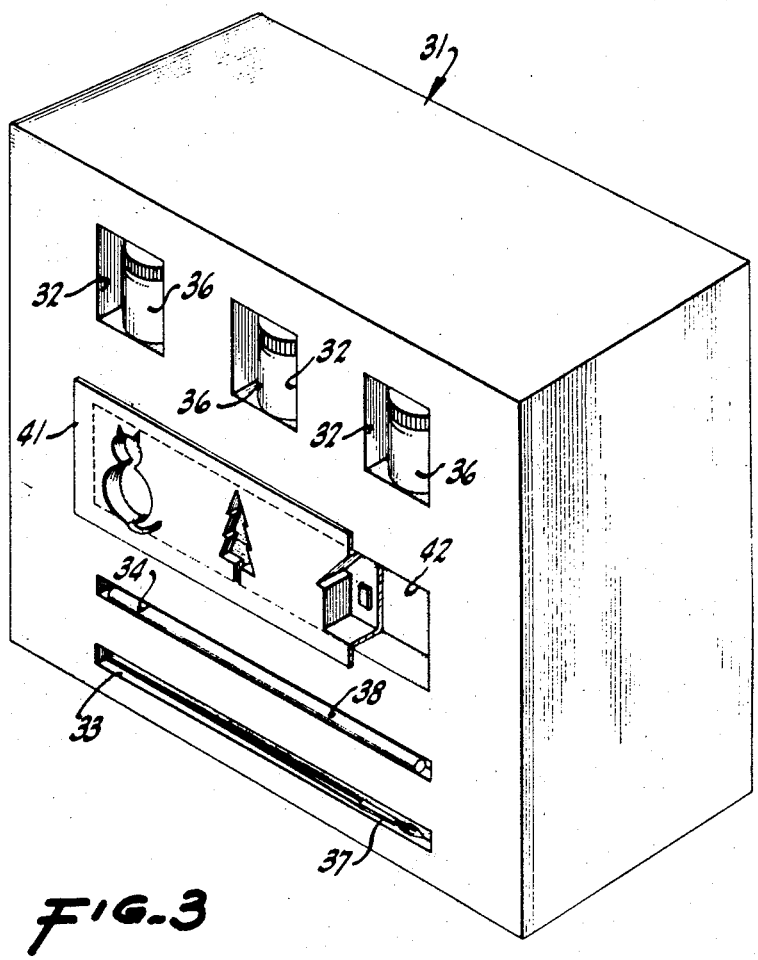

As early as 1902, and possibly before, there has been known in the art the process of mixing wood pulp, cementing material, such as plaster of paris, and water to form a plastic material that may be molded or shaped and subsequently dried. In this respect, U.S. Patent No. 692,549, issued to William Schanz, is reference. Various improvements have been made on this original material as evidenced, for example, by U.S. Patent No. 1,256,621 to Ludwig Weissman, wherein it is taught that there may be mixed together comminuted paper pulp, plaster of paris and vegetable glue, with the glue being dissolved in water, and the other ingredients added indiscriminately to attain a thorough mixture thereof. Numerous variations of the basic composition of such materials have been advanced and employed throughout the years; and a wide variety of applications for such materials has been developed. Possibly the broadest application has been in the general field of light-weight, hand-molded articles of a temporary or replaceable nature which are quite inexpensive to produce. By the addition of further constituents, the general material may be adapted to a wide variety of applications, including waterproof coverings and the like; however, the term "papier-mache" has come into common usage as defining the general mixture of comminuted paper, plaster of paris and other constituents mixed with water and subsequently dried. An Anglicized version of this term, i.e., "paper-mache" is herein employed even though the properties of the mixture differ from conventional, as noted below.

The inexpensive nature of paper mache and the ease with which it may be worked by hand or machine have established a widespread demand for the mixture of dry ingredients. Unfortunately, such a mixture is quite bulky, so as to occupy a rather large amount of space, both for storage and transportation. Additionally, the marked differences in densities of the constituents cause a settling or separation thereof when the mixture, in dry state, is transported or stored in conventional containers such as sacks. Although these problems have not prevented the industry from producing and selling dry-mix materials for the making of paper-mache, it has caused difficulties in usage of such materials. It is generally found necessary to use, or remix, an entire bag of material, upon receipt thereof by a user, in order to insure that the constituents are adequately mixed. Settling of the plaster of paris, for example, may result in the top portion of a bag of such ingredients become composed mainly of ground paper which is unsuited for the intended use of the mixture. The foregoing and other problems in this field are overcome by the present invention in the manner described below.

DISCLOSURE OF INVENTION

The present invention provides a mixture and process for the manufacture of a mixture of certain dry ingredients in a solid form highly suited to storage and shipping, as well as ultimate utilization by the addition of water to produce an inexpensive plastic material that may be readily molded, or otherwise operated upon. It is provided, in accordance with the present invention, that certain dry ingredients, including ground paper, starch, or the like, and plaster of paris, or the like, shall be thoroughly mixed, and then subjected to pressure in a mold to force together the constituents into a solid block. The present invention further provides for variation in the pressure employed in the process to thus form blocks of different density for different purposes. The block of dry ingredients may also be formed in predetermined shapes for purposes such as those set forth below.

The process of the present invention is schematically illustrated in the accompanying drawing wherein:

FIGURE 1 schematically illustrates successive steps in the process of forming instantaneous paper-mache blocks;

FIGURE 2 schematically illustrates steps in utilization of the blocks formed by the process of FIGURE 1; and FIGURE 3 illustrates possible configuration of a block in accordance with the invention.

Considering now the present invention in some detail, and referring generally to the accompanying drawing, there is first thoroughly mixed together the basic dry ingredients, as generally indicated at FIGURE 1A. With regard to the constituents of the material hereof, there is set forth below an example of a preferred mixture.

EXAMPLE 32 lbs. of magazine stock ground to pass through a screen with 7/64" openings;
148 lbs. of newsprint ground to pass through a screen with 7/64" openings;
100 lbs. precooked, degelantinized starch, or the like;
5.5 lbs. of preservative such as sodium benzoate or other nontoxic preservative;
55 lbs. of art or molding plaster; and
25 lbs. of filler such as perlite, sold, for example, under the trade name "Sil-Flo."

The proportions set forth above may be varied a few percent without departing from the teaching. In this preferred mixture, the magazine stock imparts somewhat more of a clay-like consistency of the resultant wet mix, while the starch serves as a binder; the preservative prevents the wet mixture from rapidly souring or molding, and the perlite provides a mechanical binder, or filler, which materially enhances the lack of porosity of the resultant material following its ultimate usage and drying.

One possible example of an alternative mixture of dry constituents is set forth below, together with appropriate ranges of each percentage by weight:

| Constituents: | Percentage by weight |
| --- | --- |
| Paper (80% newspaper, 20% magazine) | 45.7–47.2 |
| Art or molding plaster | 16.6–17.2 |
| Perlite | 9.7–17.1 |
| Borated dextrin | 5.6–7.9 |
| Salt | 4.3–6.6 |
| Starch | 4.3–11.1 |
| Carboxy methyl cellulose | 4.2–5.7 |

With regard to the individual properties imparted to the mix by the constituents listed above, it is noted that the perlite operates as a filler that works into openings between particles of paper and enters adjacent paper particles to mechanically interlock them. The borated dextrin, which may be purchased under the trade name "Aqua Flakes," is an adhesive which gradually becomes sticky over a five-to-ten-minute period, and attains its greatest adhesive quality about the second day after being mixed with water: it is noted that this material does not mold nor sour. The salt is employed as a preservative, and should be of fine grain commercial grade fit for human consumption, for the majority of applications of the present invention. The starch is precooked and degelatinized; and it may be purchased under the trademark "Hydroseal." The starch serves as an adhesive which maintains adhesive qualities while wet for a period of two-to-three days in a plastic bag at room temperature, and up to two weeks in a plastic bag under refrigeration. The carboxy methyl cellulose, commonly denominated C.M.C., is a thickener which forms a film over individual particles of the mixture upon wetting to increase the viscosity of the mix when wet.

The preferred mixture identified above, as well as the alternate to a substantial extent, has a remarkably clay-like composition when mixed with an appropriate amount of water, i.e., approximately one part of water to four and two-thirds parts of dry ingredients by weight. The wet mixture exhibits a substantial cohesion, and while wet does not materially adhere to other surfaces, so that it can be worked by hand, for example, in the manner of clay. In fact, it is found that the plastic mix, after addition of water, is remarkably like clay in a majority of properties, although this particular mixture exhibits a gray color that is generally somewhat mottled, and, after hardening, closely resembles a gray stone. Furthermore, the dried material, following its use as a plastic, is found to be quite hard; and, in drying, to exhibit remarkable adherence to practically all types of surfaces, including glass. The ease with which the material may be worked, and the advantageous properties of the resultant material, materially commends this mixture to widespread applicability, for both individual and commercial usage.

Following thorough mixture of the dry ingredients of the material hereof so that these ingredients are thoroughly blended, the mixture is carefully removed from the blender in such a manner as to insure that each portion contains the proper proportions of each ingredient. Individual portions of the blended mixture are weighed to establish uniform block weights, as indicated at FIGURE 1B; and then in molds are subjected to pressure by a moveable plate or press applied to the exposed surface of the mixture, as indicated in FIGURE 1C. This press is operated to compress the mixture, as indicated at FIGURE 1D, at a pressure in the range of 3.5# p.s.i. to 1600# p.s.i. over the normal settled density due to gravity. It has been found that compression at 3.5# p.s.i. is adequate to adhere the particles of the mixture, so as to produce a relatively solid form of the mixture which may be packaged and transported without disintegrating unless large local forces are experienced. The degree of compression, employed in accordance with the process hereto, is dependent upon the desired density of resultant blocks produced hereby. Naturally, the greater the compression, the greater the density and, consequently, the smaller the physical size for a particular quantity of material. Blocks formed at lower pressures may be broken apart by hand for ultimate use, while very highly compressed blocks require the use of a crusher of some sort to pulverize the material. In general, it may be anticipated that compression of the order of 100# p.s.i. to 400# p.s.i. shall be employed for general commercial utilization wherein distribution in the block form throughout the United States may be expected. Blocks so constituted may be directly sold to the general public or industrial users, and employed thereby without special equipment. These blocks, if desired, may be individually wrapped and, as indicated at FIGURE 1E, may be readily stacked for storage or transportation without the possibility of disturbing the mixture of constituents in the individual blocks.

These blocks may be wrapped or boxed for shipping, either individually or in groups, depending upon the particular type of merchandising contemplated. It will be appreciated that a minimum of space is occupied by the individual blocks, as compared to the uncompressed material; however, of even greater importance is the maintenance of the desired mixture of materials throughout the entire block. Higher compression may be employed for circumstances wherein space is of prime consideration. Thus, for shipping in industrial quantities to foreign countries, higher pressures are employed, and crushers, or the like, utilized to again pulverize the mixture for use.

In the use of the instant paper mache of the present invention, it is only necessary to break off a desired portion of a block, as indicated at FIGURE 2A, and to apply water thereto, as indicated at FIGURE 2B, to form a plastic material which may be readily molded, or worked by hand or by machine in the manner of conventional wet paper mache or clay. Articles formed of this plastic material are then dried, either at room temperature or at an elevated temperature of the order of 150° F., for example, if more rapid drying is desired, to thereby form a solid object which may be further operated upon as desired, or used directly. Upon drying, the material hardens into a strong, tough material that can be sawed, filed, cut, sanded, machine-ground, waterproofed and painted. Consequently, it will be appreciated that a wide variety of objects may be readily formed from the material hereof when water is added thereto to form a plastic material. Any desired portion of a block may be used at a time by breaking off such portion, and there may, for example, be provided scored lines on the blocks, so that readily breaking is accomplished. It is also possible to store the plastic material for two to three days in a plastic bag, for example, at room temperature before ultimate utilizaton thereof, or for as long as two to three weeks in such as a plastic bag in a refrigerator, as generally indicated at FIGURE 2C.

Insofar as ultimate utilization of the material is concerned, the dry mixture is adapted to be combined with water in a ratio of two standard cups of water (16 oz.) to one pound (16 oz.) of compressed material by weight, or 4 oz. of water to ¼ of a pound block of compressed material. The dry material and water are to be thoroughly mixed, so as to form a desired plastic material that may be employed to form, mold, cover or otherwise made into any desired shape.

The ultimate utility of the present invention is believed quite evident, for it is only necessary to add water to the mixture which may then be readily molded, with a resultant fine texture and rapid-drying time without offensive odors. It is not necessary to employ additional heating for drying of the material, although it is possible to decrease drying time by utilizing a temperature of the order of 150° F. The material is nontoxic, so as to commend it to widespread use; and, also, it will be seen to have utility as sculptural medium, as well as being adapted to molding in inexpensive molds. It is furthermore noted that the wet, or plastic, material hereof adheres to almost any surface, and again, the fine texture of the surface particularly commends it to all types of finishing, as with poster paints, tempera, casein enamels, acrylic or metallic paints.

In addition to the advantages of the mixture hereof, the compressed block form has many desirable features. While some of these are quite readily recognizable, others may not be obvious. Thus, the block form has a uniform consistency throughout which is maintained during handling and storage because of the solid form; and thus no settling occurs. The substantial discrepancy between physical size and weight of the individual constituents causes a marked separation thereof in ordinary handling and storage. Particles varying in size, as in the present mixture, and having very substantial differences in densities, as here, do not readily remain in fully blended and thoroughly mixed condition. It is by the utilization of pressure forming that the dry constituents hereof are fixed in position, after thorough mixing; and, in this way, the uniformity of mixture is maintained to the point of ultimate use.

Also, this uniform consistency provides exactly the same characteristics in each portion of the block, so that any desired part of a block may be used with the assurance that it has the desired ingredients in the proper proportion. This actually provides the most accurate basis for measuring the dry mixture for the addition of water. Note in this respect that loose material is quite hard to control in volumetric measuring, as employed by most users, while the invention in this application provides for block portions, such as one-quarter of a one-pound block, for instance, to be mixed with four ounces of water to very accurately combine exact proportions. Further to the mixing with water, the block form hereof eliminates the dust normally emitted during measuring and mixing of unpressed dry materials with water. It is also found that the block form actually mixes with water more readily than unpressed material. Although this improved mixing may not be expected, it may be explained on the basis of the close proximity of the particles of adhesive with the particles of other materials in the compressed material.

One particularly advantageous application of the present invention is illustrated in FIGURE 3 of the drawing, wherein there is shown an item adapted to retail sales. Referring to FIGURE 3, there will be seen to be illustrated a block 31 which is formed in accordance with the the present invention of compressed dry ingredients, as set forth above. In compression, this block is formed with a plurality of indentations 32, 33 and 34 therein. This may be readily accomplished by forming one surface of the press with suitable bosses thereon; and these indentations, or impressions, in the block are provided for the purpose of holding or containing material that may be utilized with the substance of the block. Thus, for example, small jars or cans of paint 36 may be inserted into the indentations 32, while a paint brush 37, for example, may be inserted in the indentation 33, and a mixing spatula 38 inserted in the indentation 34. It is also possible to provide additional elements that may be advantageously employed with the plastic material, such as an inexpensive plastic mold 41 inserted in an additional mating indentation 42 in the block. This block with materials and equipment, for example, as indicated, may then be wrapped with cellophane, or a clear plastic, wrapper and marketed as an individual item for use by children and adults, for the purposes of sculpture or the ready formation of molded items. Such a unit as illustrated in FIGURE 3 may be retailed through hobby shows and toy departments, as well as art supply houses, and will find wide utility in the field of individual art express in three dimensional form. A particular example of the present invention illustrated in FIGURE 3 is intended only as an indication of one additional utility of the present invention and possible application thereof in a single field. This application will, however, be noted to incorporate the basic advantages of the invention as described above.

That which is claimed is:

1. A process for producing material for mixture with liquid to form papier-mache comprising the steps of thoroughly mixing dry materials including comminuted paper, binder and art plaster to uniformly disperse all materials throughout the mixture, measuring portions of predetermined weight of the mixture, and compressing each measured portion of uniform dispersion at a pressure in excess of one pound per square inch to substantially fix the physical location of particles of material in the portion for subsequent handling thereof without settling of materials.

2. The process of claim 1 further defined by compressing each portion of said mixture at a pressure in excess of 100 pounds per square inch to form a solid unit of each portion.

3. The process of claim 2 further defined by compressing each portion with indentations of predetermined configuration therein.

4. The process of claim 1 further defined by compressing said portions into units of substantially solid rectangular form for ready stacking.

5. The process of claim 1 further defined by compressing said portions at a pressure in the range of 100 to 400 pounds per square inch to form solid units which may be broken apart by hand for use.

6. The process of claim 1 further defined by weighing each portion to establish the same weight for each of a plurality thereof while compressing each portion of like weight substantially to the same physical size.

7. A mixture of materials for use with water to form a clay-like substance that hardens upon drying comprising the following materials substantially in the stated proportions by weight:

148 pounds of comminuted paper stock having individual piece sizes less than 1/8 inch
32 pounds comminuted magazine stock having individual piece sizes less than 1/8 inch
100 pounds of precooked, degelantinized starch
5.5 pounds of dry preservative
55 pounds of art plaster
25 pounds of perlite filler.

8. An article of manufacture comprising of solid block of compressed dry materials including comminuted paper, binder and plaster having indentations therein of predetermined size and configurations, elements adapted for use with a mixture of the dry materials and liquid disposed in said indentations; and a wrapping about the block and elements therein with said wrapper being transparent at least over said indentations.

9. The article of claim 8 further defined by said dry ingredients including finely ground paper and magazine stock, art or molding plaster, binder and preservative; and said ingredients being united in solid form by a pressure of the order of 100 to 400 pounds per square inch.

References Cited

UNITED STATES PATENTS

| 1,256,621 | 2/1918 | Weissmann | 106—113 |
| 1,983,590 | 12/1934 | Anderson. | |
| 2,295,287 | 9/1942 | Muench | 206—83.5 |
| 2,388,543 | 11/1945 | Hoggatt | 106—114 |
| 2,781,799 | 2/1957 | Bradford. | |

WILLIAM T. DIXSON, Jr., Primary Examiner

U.S. Cl. X.R.

206—83.5; 106—113